No. 658,994. Patented Oct. 2, 1900.
J. A. MOSHER.
FOCUSING DEVICE FOR CAMERAS.
(Application filed Aug. 31, 1899.)
(No Model.)

Witnesses:
W. C. Coclies
W. H. Colton

Inventor:
John A. Mosher.

By Louis K. Gillson
Atty.

THE NORRIS PETERS CO., PHOTO-LITHO., WASHINGTON, D. C.

UNITED STATES PATENT OFFICE.

JOHN A. MOSHER, OF CHICAGO, ILLINOIS, ASSIGNOR TO THE ADAMS & WEST-LAKE COMPANY, OF SAME PLACE.

FOCUSING DEVICE FOR CAMERAS.

SPECIFICATION forming part of Letters Patent No. 658,994, dated October 2, 1900.

Application filed August 31, 1899. Serial No. 729,044. (No model.)

*To all whom it may concern:*

Be it known that I, JOHN A. MOSHER, a citizen of the United States, and a resident of Chicago, county of Cook, and State of Illinois, have invented certain new and useful Improvements in Focusing Devices for Cameras, of which the following is a specification and which are illustrated in the accompanying drawings, forming a part thereof.

This invention relates to focusing mechanism for cameras; and its object is to provide improved means for utilizing the finder attachment of a camera in adjusting the focus of the camera-lens; and it consists in the mechanism hereinafter fully described and which is illustrated in the accompanying drawings, in which—

Figure 1:
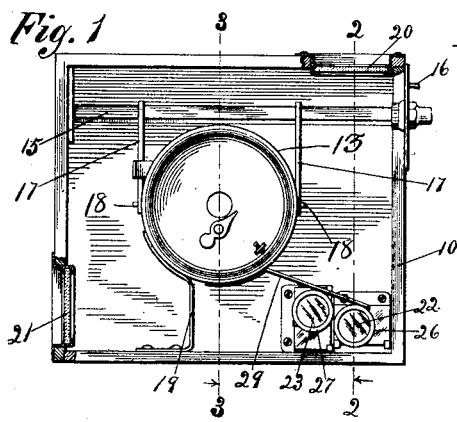
Figure 2:
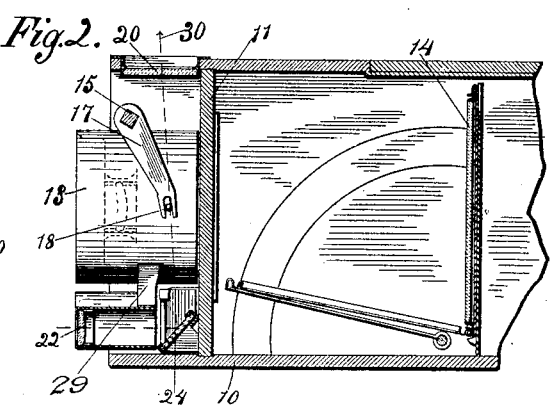
Figure 3:
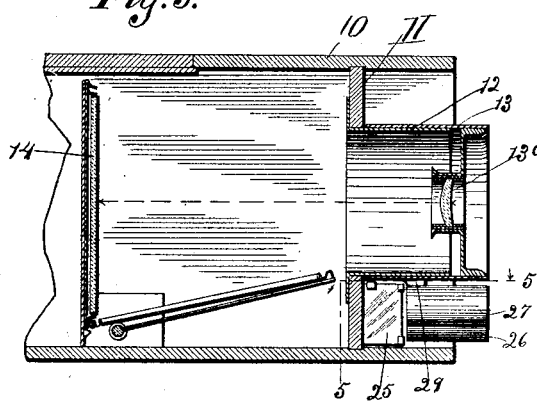
Figure 4:
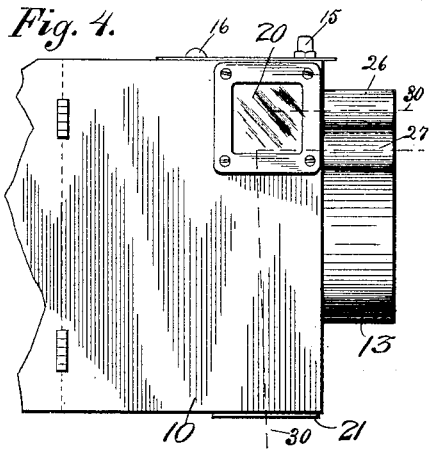
Figure 5:
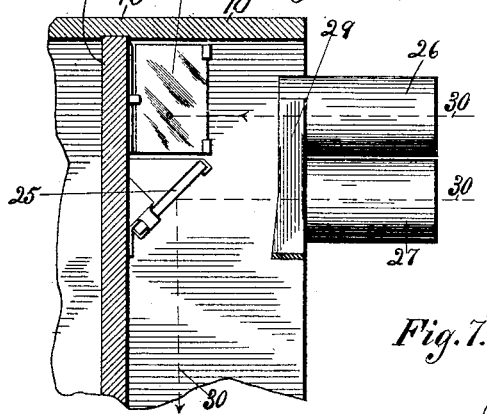
Figure 6:
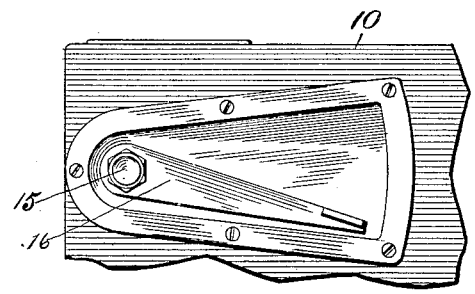
Figure 7:
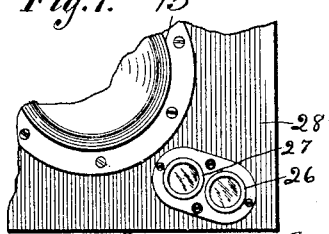

Figure 1 is a front elevation of a hand-camera with the front plate removed, certain parts being shown in section. Fig. 2 is a sectional view on the line 2 2 of Fig. 1, the shutter mechanism being removed. Fig. 3 is a sectional view on the line 3 3 of Fig. 1, the shutter mechanism being removed. Fig. 4 is a detail plan of the camera. Fig. 5 is a sectional view on the line 5 5 of Fig. 3. Fig. 6 is a detail side elevation of the camera, and Fig. 7 is a detail front elevation of the same.

The invention herein shown and described may be applied to any form of photographic camera. I show it in connection with a hand-camera of the type forming the subject of Letters Patent No. 598,701 to Henry Gamwell and Charles Gamwell.

The camera-case is shown at 10 and is provided with a transverse partition 11, located a short distance back of the front of the camera, and centrally through this plate is fixed a tube 12, upon which the lens-tube 13 is telescopically mounted, so that it may be reciprocated for the purpose of bringing the focus of the lens 13$^a$ to the plane of a plate 14, properly seated within the camera. A rock-shaft 15 is journaled across the interior of the camera-case forward of the plate 11 and projects through one of the side walls of the case, and to this projecting end is applied a crank-arm 16. Crank-arms 17, preferably two in number, are fixed upon the shaft within the camera, and each is in sliding engagement with a stud 18, projecting radially from the tube 13, so that by the oscillation of the shaft 15 this tube is caused to reciprocate. In order to hold the tube 13 in any position to which it may be thus adjusted, a friction-detent should be applied to some of the moving parts. I show for this purpose a simple form of spring 19, attached to one of the side walls of the case 10 and impinging against the tube 13.

The finder employed is of the camera-obscura type, and as the camera shown is of the usual oblong rectangular form in cross-section two finders are shown, so that either one of the wide or one of the narrow edges of the plate may serve as the top. The finder mechanism is located entirely forward of the plate 11, which serves as a screen to protect the sensitized plate from the light entering through the finder-lenses. The finders shown consist of the ground-glass screens 20 21, set in the walls of the case, the lenses 22 23 cooperating, respectively, with these screens and the inclined mirrors 24 25 for changing the direction of the rays of light entering through the lenses, so as to throw them upon the screens, as indicated by the dotted lines 30. The lenses 22 23 are mounted, respectively, within tubes 26 and 27, which are fitted so as to reciprocate in suitable apertures in the front plate 28 of the case. These tubes are rigidly attached to the tube 13. As shown, this attachment is by means of a single rigid arm 29. The several lenses are of uniform focal distance and are so mounted in their respective tubes that the distances from the several lenses to the plane upon which they are respectively adapted to focus an image are identical, and as the several tubes 13, 26, and 27 necessarily reciprocate together it is obvious that when the image thrown upon either of the finder-screens is properly focused by the manipulation of the crank-arm 16 it will also be focused upon the plate 14.

I am aware that I am not the first to utilize the finder of a camera in adjusting the focus of the camera-lens to the range of the object. Heretofore, however, so far as I am informed, no suitable means have been provided for satisfactorily adjusting the lens-tubes, particularly in connection with hand-cameras. In instruments of this kind it is of importance that the box or case be substantial and without other movable parts than the door necessary to the introduction and removal of the plate-holders. It is also important that the means for controlling the focusing mechanism should be so disposed and so easy of manipulation that it can be controlled while the instrument is being held in position for making an exposure, so that the user may with a finger of one hand secure the proper focus and with a finger of the other hand operate the shutter. These several advantages are present in the camera herein shown and described and have, I believe, never before been secured.

I claim as my invention—

In a camera, in combination, a box 10, having a fixed front plate 28, and a fixed division-plate 11, back of such front plate, a telescopic lens-tube fixed to and setting through such partition and projecting through and movable in the aperture in the front plate; lens-tubes 26 and 27, adapted to reciprocate through apertures in said front plate; an arm 29, rigidly securing the lens-tubes 26 and 27, to the movable portion of the telescopic lens-tube; screens upon which the lenses of the tubes 26 and 27, are adapted to be focused; a rock-shaft 15, journaled in the side walls of the camera-box between its front plate and the partition 11; a pair of crank-arms fixed upon such shaft and pivotally connected with the movable portion of the telescopic tube; and a crank-arm 16, fixed upon the outer end of the rock-shaft whereby the said shaft may be manually oscillated; all substantially as described and for the purposes specified.

JOHN A. MOSHER.

Witnesses:
ISABEL A. HELMICH,
LOUIS K. GILLSON.